United States Patent
Barenbrug et al.

(10) Patent No.: US 10,043,304 B2
(45) Date of Patent: Aug. 7, 2018

(54) THREE DIMENSIONAL IMAGE DATA PROCESSING

(75) Inventors: Bart Gerard Bernard Barenbrug, Waalre (NL); Bernardus Antonius Maria Zwaans, Eindhoven (NL); Harald Hermanus Albertus Van Woerkom, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 424 days.

(21) Appl. No.: 13/119,773

(22) PCT Filed: Sep. 23, 2009

(86) PCT No.: PCT/IB2009/054160
§ 371 (c)(1),
(2), (4) Date: Mar. 18, 2011

(87) PCT Pub. No.: WO2010/035223
PCT Pub. Date: Apr. 1, 2010

(65) Prior Publication Data
US 2011/0181588 A1    Jul. 28, 2011

(30) Foreign Application Priority Data
Sep. 25, 2008    (EP) .................................. 08165057

(51) Int. Cl.
*G06T 15/00*    (2011.01)
*G06T 15/20*    (2011.01)

(52) U.S. Cl.
CPC .................. *G06T 15/205* (2013.01)

(58) Field of Classification Search
CPC ......... G06T 15/205; G06T 2207/10028; G06T 15/20; G06T 19/00; G06T 15/06;
(Continued)

(56) References Cited

U.S. PATENT DOCUMENTS

| 5,684,941 A | 11/1997 | Dye |
| 6,266,068 B1 | 7/2001 | Kang et al. |

(Continued)

FOREIGN PATENT DOCUMENTS

| EP | 1612738 A2 | 1/2006 |
| JP | 4205275 A | 7/1992 |

(Continued)

OTHER PUBLICATIONS

Hasinoff et al: "Boundary Matting for View Synthesis"; Computer Vision and Image Understanding; 2006, vol. 103, pp. 22-32.

(Continued)

*Primary Examiner* — Gregory J Tryder
*Assistant Examiner* — Kwang Lee

(57) ABSTRACT

Three dimensional image data is provided which includes data representing a first image which specifically may be a background image. A mixed image which is a combination of the first image and a second image which specifically may be a foreground image, a transparency map related to the mixed image comprising transparency values for pixels of the mixed image and a depth indication map for the mixed image comprising depth indication values for pixels of the mixed image. The use of a mixed image may allow three dimensional processing while at the same time allowing 2D backwards compatibility. Image quality around image objects may be improved by modifying transparency values in response to depth indication values and/or depth indication values in response to transparency values. Specifically, an improved alignment of transitions of depth indication values and transparency values may provide improved three dimensional foreground image object edge data.

30 Claims, 9 Drawing Sheets

(58) Field of Classification Search
CPC ...... G03B 15/10; G03B 21/001; G03B 29/00; H04N 7/144; H04N 5/272; H04N 2013/0081; H04N 13/0488; G06K 2209/40; G09G 2300/023; G01B 11/2513; G11B 2220/254; G11B 270/34
USPC ......................................................... 345/419
See application file for complete search history.

(56) References Cited

U.S. PATENT DOCUMENTS

| | | | |
|---|---|---|---|
| 6,809,730 B2 | 10/2004 | Howson | |
| 7,227,544 B2 | 6/2007 | Alkouh | |
| 7,508,392 B2* | 3/2009 | Barfuss et al. | 345/428 |
| 7,982,734 B2* | 7/2011 | Miller | 345/426 |
| 2006/0072041 A1* | 4/2006 | Kii | H04N 9/75 348/586 |
| 2006/0087556 A1 | 4/2006 | Era | |
| 2006/0114253 A1 | 6/2006 | Zitnick, III | |
| 2006/0267977 A1 | 11/2006 | Barfuss | |
| 2007/0057944 A1 | 3/2007 | Redert | |
| 2007/0252804 A1 | 11/2007 | Engel et al. | |
| 2008/0079719 A1 | 4/2008 | Woo | |
| 2009/0219282 A1* | 9/2009 | Kim et al. | 345/419 |
| 2010/0220920 A1* | 9/2010 | Barenbrug | 382/154 |

FOREIGN PATENT DOCUMENTS

| | | | |
|---|---|---|---|
| JP | 11339008 A | 12/1999 | |
| JP | 2002329210 A | 11/2002 | |
| WO | 2006067714 A2 | 6/2006 | |
| WO | 2007063477 A2 | 6/2007 | |
| WO | 2007096816 A2 | 8/2007 | |

OTHER PUBLICATIONS

Kang et al: "Multi-Layered Image-Based Rendering"; Proceedings, Graphics Interface, Jun. 1999, pp. 98-106.

Zitnick et al: "High-Quality video View Interpolation Using a Layered Representation"; ACM Transactions on Graphics, Aug. 2004, vol. 23, No. 3, pp. 600-608.

Gortler et al: "Rendering Layered Depth Images"; Microsoft Research Technical Report-MSTR-TR-97-09, Mar. 1997, 11 page document.

Jouppi et al: "Z3: An Economical Hardware Technique for High-Quality Antialiasing and Transparency"; Proceedings of the ACM SIGGRAPH/EUROGRAPHICS workshop on Graphics hardware, 1999, 10 page document.

Zeng, Zhang et al "Three Dimensions Reconstruction of CT Image by MATLAB", MATLAB CT, vol. 13, No. 2, May 2004.

Azuma, Takeo et al "Disparity Estimation using Edge Information for Synthesizing Intermediate-View Images from Stereo Images", vol. 52, No. 3, 1998.

Nakayama, Ken et al "Transparency: Relation to Depth, Subjective contours, Luminance, and Neon Color Spreading", Perception, vol. 19. pp. 497-513, 1990.

* cited by examiner

THREE DIMENSIONAL IMAGE DATA PROCESSING

FIELD OF THE INVENTION

The invention relates to a three dimensional image data including three dimensional video image data.

BACKGROUND OF THE INVENTION

Three dimensional displays add a third dimension to the viewing experience by providing a viewer's eyes with different views of the scene being watched. A popular approach for representing three dimensional images is to use one or more two dimensional (2D) images plus a depth representation providing information of the third dimension. Such an approach provides a number of advantages including allowing three dimensional views to be generated with relatively low complexity and providing an efficient data representation thereby reducing e.g. storage and communication resource requirements for three dimensional (3D) image (and video) signals. The approach also allows 2D images to be generated with different viewpoints and viewing angles than the 2D images that are included in the 3D image data.

A drawback of representing a 3D image by a single 2D image and associated depth information is that it does not include information about background image areas that are occluded by foreground objects. Accordingly, if the scene is rendered for a different viewpoint, no information can be revealed behind the foreground objects. Accordingly, it has been proposed to use multi-layer image and depth representations comprising a plurality of two dimensional images (e.g. a foreground image and a background image) with associated depth information. A description of how to render new views from such information can be found in Steven J. Gortler and Li-wei He, Rendering Layered Depth Images, Microsoft Technical Report MSTR-TR-97-09, a.o. available at http://research.microsoft.com/research/pubs/view.aspx?type=Technical%20Report&id=20 and in for example U.S. Patent Application US20070057944.

In approaches using more than one layer (i.e. a plurality of overlaying 2D images) it has been proposed to allow layers to be semi-transparent. In the field of computer graphics, such an approach is for example described in Norman P. Jouppi and Chun-Fa Chang, "An Economical Hardware Technique for High-Quality Antialiasing and Transparency", Proceedings of Eurographics/Siggraph workshop on graphics hardware 1999. Such an approach allows semi-transparent materials to be visualised (e.g. water, smoke, flames) and also allows improved anti-aliasing of edges of objects at different depths. Specifically, it allows for a more gradual transition of edges. Thus, the transparency may not just be used for representing semi-transparent objects, but may also allow anti-aliasing of the edges of the foreground objects by making an edge semi-transparent such that a transparency value represents how much of a pixel should be foreground and how much of the background should visible. An example of such an approach can be found in: C. Lawrence Zitnick Sing Bing Kang Matthew Uyttendaele Simon Winder Richard Szeliski, "High-quality video view interpolation using a layered representation", in Proceedings of Siggraph 2004.

However, a problem with such approaches is that backwards compatibility is suboptimal. In particular, in order to generate a 2D image, the 3D image data must be processed by an algorithm capable of understanding the three dimensional format. Accordingly, the signal cannot be used in traditional systems that do not have such functionality.

Also, another disadvantage of the approach is that it may in some scenarios not provide an optimal image quality. In particular, in some embodiments, the processing of the images and associated depth and transparency information will result in the rendered edges of foreground image objects being distorted.

Hence, an improved approach for 3D image data processing would be advantageous and in particular an approach allowing increased flexibility, improved backwards compatibility, improved image quality, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided method of providing three dimensional image data, the method comprising: providing a first image; providing a mixed image being a combination of the first image and a second image, the second image being a foreground image relative to the first image and the combination being in response to transparency data for the second image; providing a transparency map related to the mixed image, the transparency map comprising transparency values for pixels of the mixed image; providing a first depth indication map for the mixed image, the first depth indication map comprising depth indication values for pixels of the mixed image; and providing the three dimensional image data comprising the first image, the mixed image, the transparency map and the first depth indication map.

The image data provided in accordance with the present invention can be used to render image elements, such as pixels of views and/or full images representing views of the three dimensional image data. The invention may allow improved 3D image processing and/or performance. In particular, the 3D image data may in many embodiments provide improved backwards compatibility. Specifically, the advantages of 3D image data comprising depth and transparency information allowing 3D processing is provided together with information that can be processed as a conventional 2D image to provide a suitable 2D representation of the image. Specifically, the mixed image may e.g. directly be presented as a 2D image by a 2D presentation device.

Specifically, in some embodiments, the foreground and background of an image are not stored separately as different images but instead the background may be stored together with a mixed version of the foreground and background (mixed according to the transparency). This 2D image can then directly be used by a 2D presentation device as it corresponds to a conventional 2D image comprising both background and foreground. However, at the same time the 2D image can be used by 3D presentation devices to generate 3D images or 2D images representing other viewing angles.

The first depth indication map provides depth related information for the mixed image. Thus, the first depth indication map may be a mixed depth indication map comprising depth indication values for pixels of both the first and second image.

The 3D image data may be for an image of a sequence of images. Specifically, the 3D image data may be for an image of a video sequence comprising a plurality of 3D images.

The first image may specifically be a background image and the second image may specifically be a foreground image.

The transparency map related to the mixed image may specifically correspond to a transparency map for the second image and thus the transparency map may be a transparency map for the second image. Specifically, the transparency map may typically be a foreground transparency map.

In accordance with an optional feature of the invention, the method further comprises generating an image signal comprising the three dimensional image data.

The image signal may specifically be an encoded image signal which comprises one or more images. For example, the image signal may be a video signal comprising a plurality of images in the form of video frames. The approach may allow an image signal to be generated, stored and distributed which allows both efficient 3D processing as well as backwards compatibility to conventional 2D devices.

In accordance with an optional feature of the invention, the method further comprises rendering a view for a viewing angle different than a viewing angle of the first and second image in response to the three dimensional image data.

The approach may allow different viewing angles to be rendered by a suitably equipped apparatus while also providing backwards compatibility.

In accordance with an optional feature of the invention, the method further comprises rendering a three dimensional image in response to the three dimensional image data.

The approach may allow 3D images to be rendered by a suitably equipped apparatus while also providing backwards compatibility.

In accordance with an optional feature of the invention, the method further comprises modifying values of a first set of values from a group of value sets in response to values of a second set of values from the group of value sets, the group of value sets comprising a set of values corresponding to transparency values of the transparency map and a set of values corresponding to depth indication values of the first depth indication map.

This may allow improved image quality in many embodiments and scenarios. In particular, it may in many scenarios provide improved image quality around edges of image objects of the first image. The inventors have in particular realized that by adjusting the transparency values and the depth indication values with respect to each other, an improved rendering of (relative) foreground image objects can be achieved.

In accordance with an optional feature of the invention, the method further comprises detecting an image region corresponding to an image object edge and wherein modifying values comprises modifying values for the image region.

The inventors have realized that improved image quality can be achieved for images rendered on the basis of depth indication values and transparency values for a mixed image/foreground image if in particular image object edges are processed. The object edge may correspond to a transition of the transparency values and/or the depth indication values for the mixed image.

In accordance with an optional feature of the invention, the method further comprises modifying a relationship between transparency values of the transparency map and depth indication values of the first depth indication map in an image region.

This may allow improved image quality in many embodiments and scenarios. In particular, it may in many scenarios provide improved image quality around edges of image objects of the first image. The inventors have in particular realized that by adjusting the transparency values and the depth indication values with respect to each other, an improved rendering of (relative) foreground image objects can be achieved.

In accordance with an optional feature of the invention, modifying the relationship comprises aligning a transparency transition of the transparency map along an image direction and a depth transition of the first depth indication map along the image direction.

This may in many embodiments facilitate implementation and/or improve performance. In particular, by aligning transparency and depth transitions, a reduction in image artifacts introduced by 3D processing of (relative) foreground image object edges may be obtained.

In accordance with an optional feature of the invention, the method further comprises modifying transparency values of the transparency map in response to depth indication values of the first depth indication map.

This may allow improved image quality in many embodiments and scenarios. In particular, it may in many scenarios provide improved image quality around edges of image objects of the first image. The inventors have in particular realized that by adjusting the transparency values and the depth indication values with respect to each other, an improved rendering of (relative) foreground image objects can be achieved.

In accordance with an optional feature of the invention, modifying transparency values comprises biasing transparency values of the transparency map towards higher transparency in an image region being part of a transparency transition in the transparency map and not being part of a depth transition in the first depth transition map.

This may allow an advantageous implementation and/or may provide improve image quality for 3D processing. The feature may in particular render image artifacts introduced by 3D processing to image object edges less noticeable.

In accordance with an optional feature of the invention, modifying transparency values comprises modifying transparency values in at least part of an image region comprising a depth transition and a transparency transition along an image direction by: determining a first depth transition point in response to the depth indication values of the first depth transition map along the image direction; biasing transparency values of the transparency map along the image direction towards higher transparency for pixels of an interval along the image direction extending from the first depth transition point in a direction of at least one of a higher transparency and a lower depth.

This may allow an advantageous implementation and/or may provide improved image quality for 3D processing. The feature may in particular render image artifacts introduced by 3D processing to image object edges less noticeable.

In accordance with an optional feature of the invention, the method further comprises determining a first transparency transition point in response to the transparency values of the first transparency map along the image direction and wherein the interval extends from the first transparency point to the first depth transition point.

This may allow facilitated implementation while providing efficient performance and high image quality. In particular, it may allow a practical and efficient approach for adapting 3D performance around image object edges.

In accordance with an optional feature of the invention, the method further comprises determining the first transparency transition point as a point along the image direction having a highest transparency value in an evaluation interval extending from the depth transition point in a direction of at least one of a higher transparency and a lower depth.

This may allow an advantageous implementation and/or may provide improve image quality for 3D processing. The feature may in particular render image artifacts introduced by 3D processing to image object edges less noticeable.

In accordance with an optional feature of the invention, biasing comprises setting transparency values of all transparency values of the interval to a highest transparency value of the interval prior to biasing.

This may allow a reduced complexity implementation and/or may further reduce or minimize the perceptibility of image artifacts introduced by 3D processing to image object edges.

In accordance with an optional feature of the invention, the method further comprises providing a second depth indication map for the first image, the second depth indication map comprising depth indication values for pixels of the first image; and wherein determining the first depth transition point comprises further determining the first depth transition point in response to depth indication values of the second depth indication map.

This may allow a particularly suitable way of determining a depth transition point and may indeed be used to determine the existence of a transition of the depth indication values. Thus, the approach may allow a reliable detection of an image object edge. The approach is particularly suitable to the approach of using a mixed image since the relative depth information between the first image and the mixed image provides direct information indicating when the mixed image is dominated by the first and second images respectively.

In accordance with an optional feature of the invention, determining the depth transition point comprises determining the depth transition point in response to a comparison of depth indication values of the first depth indication map and depth indication values of the second depth indication map.

This may allow efficient and/or accurate determination of the depth transition point.

In accordance with an optional feature of the invention, determining the depth transition point comprises determining the depth transition point as a point along the image direction for which a difference between a depth indication value of the second depth indication map and a depth indication value of the first depth indication map crosses a threshold.

This may allow efficient and/or accurate determination of the depth transition point.

In accordance with an optional feature of the invention, the image direction corresponds to a scanline direction.

This may allow a particularly suitable implementation and may in particular allow low complexity processing to result in accurate detections of transitions in transparency and depth values as well as a low complexity yet highly efficient adaptation of the transparency values and/or the depth indication values.

In accordance with an optional feature of the invention, the method further comprises modifying depth indication values of the first depth indication map in response to transparency values of the transparency map.

This may allow improved image quality in many embodiments and scenarios. In particular, it may in many scenarios provide improved image quality around edges of image objects of the first image. The inventors have in particular realized that by adjusting the transparency values and the depth indication values with respect to each other, an improved rendering of (relative) foreground image objects can be achieved.

In accordance with an optional feature of the invention, modifying depth indication values comprises biasing depth indication values of the first depth indication map towards foreground depth indication values in an image region corresponding to a transparency transition in the transparency map.

This may allow an advantageous implementation and/or may allow improved image quality for 3D processing. The feature may in particular provide an increased probability that pixels comprising a contribution from an image object of the second image are assumed to have a depth corresponding to that object. As a specific example, it may allow pixels having a partial contribution from a foreground image to be treated as part of the foreground by the 3D processing thereby reducing errors and artifacts.

In accordance with an optional feature of the invention, modifying depth indication values comprises modifying depth indication values in at least part of an image region comprising a depth transition and a transparency transition along an image direction by: determining a first transition point in response to at least one of the transparency values of the transparency map and the depth indication values of the first depth indication map along the image direction; biasing depth indication values of the first depth indication map along the image direction towards foreground depth indication values for pixels of an interval along the image direction ending at the first transparency transition point and extending from the first transparency point in a direction of lower transparency.

This may allow an advantageous implementation and/or may allow improved image quality for 3D processing. The feature may in particular provide an increased probability that pixels comprising a contribution from an image object of the second image are assumed to have a depth corresponding to that object. As a specific example, it may allow pixels having a partial contribution from a foreground image to be treated as part of the foreground by the 3D processing thereby reducing errors and artifacts.

In accordance with an optional feature of the invention, the first transition point is a first transparency transition point determined in response to the transparency values of the transparency map and the method further comprises: determining a second transparency transition point in response to the transparency indication values of the transparency map along the image direction, the second transparency transition point corresponding to a lower transparency than the first transparency point; and wherein the interval extends from the first depth transition point to the second depth transition point.

This may allow an improved determination of the interval in which biasing is performed.

In accordance with an optional feature of the invention, the first transition point is a first transparency transition point determined in response to the transparency values of the transparency map and the method further comprises: determining a first depth transition point in response to depth indication values of the first depth indication map along the image direction; determining a transparency search interval in response to the first depth transition point; and wherein determining the first transparency point comprises determining the first transparency point in response to transparency values in an the transparency search interval.

This may allow a particular advantageous approach for determining an interval in which biasing is performed.

In accordance with an optional feature of the invention, biasing depth indication values comprises setting all depth indication values of the interval to a depth indication value corresponding to a furthest foreground depth indication value for the interval prior to biasing.

This may allow a reduced complexity implementation and/or may provide improved image quality.

In accordance with an optional feature of the invention, the image direction corresponds to a scanline direction.

This may allow a particularly suitable implementation and may in particular allow low complexity processing to result in accurate detections of transitions in transparency and depth values as well as a low complexity yet highly efficient adaptation of the transparency values and/or the depth indication values.

According to another aspect of the invention, there is provided a method of encoding an image signal, the method comprising: providing a first image; providing a mixed image being a combination of the first image and a second image, the second image being a foreground image relative to the first image and the combination being in response to a transparency value for the second image; providing a transparency map related to the mixed image, the transparency map comprising transparency values for pixels of the mixed image;

providing a first depth indication map for the mixed image, the first depth indication map comprising depth indication values for pixels of the mixed image; and generating the image signal comprising encoded data representing the first image, the mixed image, the transparency map and the first depth indication map.

In accordance with an optional feature of the invention, the method further comprises modifying transparency values of the transparency map in response to depth indication values of the first depth indication map.

In accordance with an optional feature of the invention, the method further comprises modifying depth indication values of the first depth indication map in response to transparency values of the transparency map.

According to an aspect of the invention there is provided a method of rendering an image, the method comprising: providing a first image; providing a mixed image being a combination of the first image and a second image, the second image being a foreground image relative to the first image and the combination being in response to a transparency value for the second image; providing a transparency map related to the mixed image, the transparency map comprising transparency values for pixels of the mixed image; providing a first depth indication map for the mixed image, the first depth indication map comprising depth indication values for pixels of the mixed image; and rendering the image in response to the first image, the mixed image, the transparency map and the first depth indication map.

In accordance with an optional feature of the invention, rendering comprises rendering the image as an image corresponding to a different viewing angle than a viewing angle of the first image and the second image.

In accordance with an optional feature of the invention, the method further comprises modifying transparency values of the transparency map in response to depth indication values of the first depth indication map.

In accordance with an optional feature of the invention, the method further comprises modifying depth indication values of the first depth indication map in response to transparency values of the transparency map.

According to another aspect of the invention, there is provided an image signal encoder comprising: means for providing a first image; means for providing a mixed image being a combination of the first image and a second image, the second image being a foreground image relative to the first image and the combination being in response to a transparency value for the second image; means for providing a transparency map related to the mixed image, the transparency map comprising transparency values for pixels of the mixed image; means for providing a first depth indication map for the mixed image, the first depth indication map comprising depth indication values for pixels of the mixed image; and means for generating the image signal comprising encoded data representing the first image, the mixed image, the transparency map and the first depth indication map.

In accordance with an optional feature of the invention, the image signal encoder further comprises means for modifying transparency values of the transparency map in response to depth indication values of the first depth indication map.

In accordance with an optional feature of the invention, the image signal encoder further comprises means for modifying depth indication values of the first depth indication map in response to transparency values of the transparency map.

In accordance with another aspect of the invention, there is provided an image rendering unit comprising: means for providing a first image; means for providing a mixed image being a combination of the first image and a second image, the second image being a foreground image relative to the first image and the combination being in response to a transparency value for the second image; means for providing a transparency map related to the mixed image, the transparency map comprising transparency values for pixels of the mixed image; means for providing a first depth indication map for the mixed image, the first depth indication map comprising depth indication values for pixels of the mixed image; and means for rendering the image in response to the first image, the mixed image, the transparency map and the first depth indication map.

In accordance with an optional feature of the invention, the image rendering unit further comprises means for modifying transparency values of the transparency map in response to depth indication values of the first depth indication map.

In accordance with an optional feature of the invention, the image rendering unit further comprises means for modifying depth indication values of the first depth indication map in response to transparency values of the transparency map.

According to another aspect of the invention, there is provided an image signal comprising: data representing a first image; data representing a mixed image being a combination of the first image and a second image, the second image being a foreground image relative to the first image and the combination being in response to a transparency value for the second image; data representing a transparency map related to the mixed image, the transparency map comprising transparency values for pixels of the mixed image;

data representing a first depth indication map for the mixed image, the first depth indication map comprising depth indication values for pixels of the mixed image.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 3 illustrates an example of an image signal encoder in accordance with some embodiments of the invention;

DETAILED DESCRIPTION OF THE EMBODIMENTS

The following description focuses on embodiments of the invention applicable to a representation of 3D image information that may be applied to a single frame of a video signal. However, it will be appreciated that the invention is not limited to this application but may be applied to many other image types including for example still images, animations etc.

Figure 1:
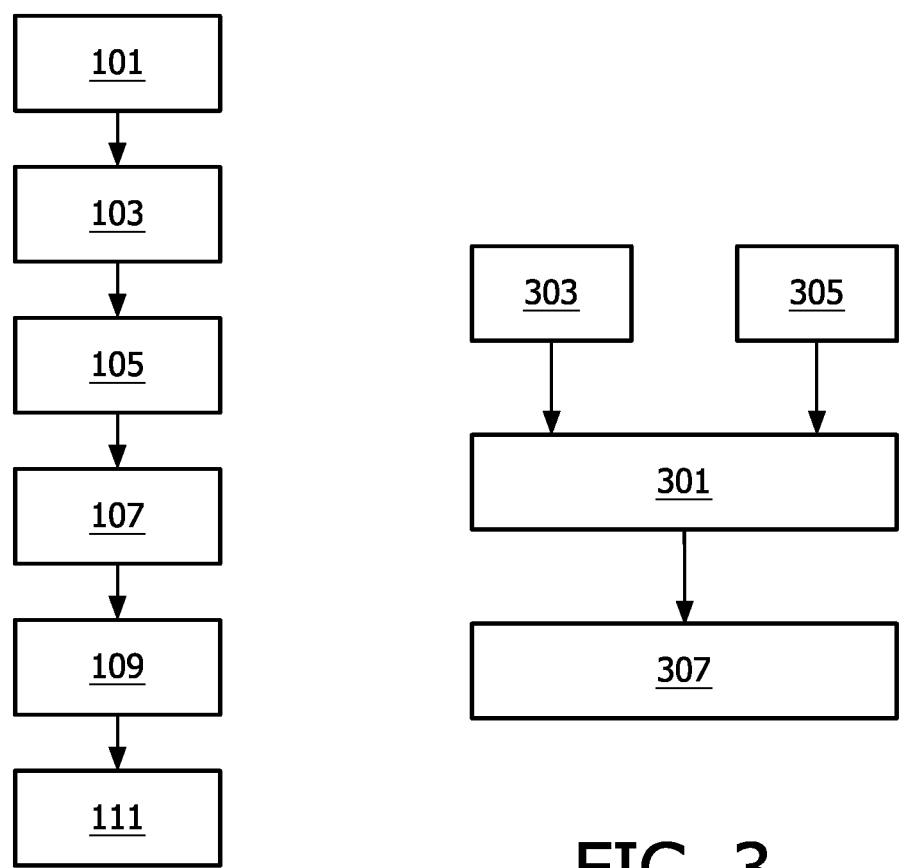
FIG. 1 illustrates an example of a method for providing 3D image data in accordance with some embodiments of the invention.

FIG. 1 illustrates a method for providing three dimensional (3D) image data. The 3D image data may for example be used to generate 3D images or to generate different viewpoints for different two dimensional (2D) images of a scene. In the example, 3D image data is generated that incorporates two images, depth information and transparency information. It will be appreciated that in other embodiments, the 3D data may comprise more 2D images corresponding to more layers.

Specifically, the 3D image data comprises a background image, a mixed image which contains contributions from the background image and a foreground image, as well as depth and transparency information related to the mixed image. In addition, the 3D image data may include depth information for the background image data.

The method initiates in step 101 wherein a first image is provided. The first image is in the example a background image. Step 101 is followed by step 103 wherein a mixed image is provided which is a combination of the first image and a second image which is a foreground image. Thus, the background and foreground images are overlaying images of the same scene. The foreground image may consist in or comprise for example image objects that are in the foreground of the background image, added text, subtitles, on screen display information etc.

The mixed image thus represents both image objects that may occur in the background as well as in the foreground.

The combination of foreground and background image components takes into account the transparency of foreground image objects. Thus, for pixels for which the transparency value corresponds to no transparency (fully opaque) the pixel value is selected as that of the foreground image. Conversely, for pixels for which the transparency value corresponds to full transparency (no opacity) the pixel value is selected as that of the background image. For pixel values being semi-transparent, the mixed image may be calculated by combining the pixel values of the foreground and the background. For example, the mixed image pixel value y for pixel n may simply be calculated as:

$$y_n = t_n \cdot f_n + (1 - t_n) \cdot b_n$$

where f is the foreground image pixel value, b is the background image pixel value and t is the transparency value for pixel n and is a value between zero and one (where zero represents total transparency and one represents full opacity).

It will be appreciated that in other embodiments, other means of combining the images may be used. It will also be appreciated that in other embodiments, more than two layers of images may be used and that the first and second image in that case need not be background and foreground images but that one or both of the images may be intermediate images/layers. However, the second image will be further in the foreground than the first image.

Step 103 is followed by step 105 wherein a transparency map related to the mixed image is presented. The transparency map comprises transparency values for the pixels of/related to the mixed image. In particular, the transparency map may have a transparency value for each pixel of the mixed image. The transparency map may correspond to a transparency map for the foreground image and may specifically have a value corresponding to full transparency for image pixels for which there is no contribution to the mixed image from the foreground image and a value corresponding to full opacity for image pixels for which there is no contribution to the mixed image from the background image. It may furthermore have intermediate transparency values for semi transparent image objects of the foreground image as well as for image regions that correspond to edges around image objects of the foreground image. The transparency map may specifically be identical to a foreground transparency map used to generate the mixed image.

It will be appreciated that different approaches may be used to generate the transparency map. For example, for computer generated images, the transparency value may be generated by the computer graphics rendering process, e.g. via super sampling or using textures with transparencies associated to them. Another means to obtain transparencies is to use a technique known in the art as alpha matting to obtain transparency near edges (either for blue or green screen recordings), or from composite images. Yet another way, is to overlay a semi-transparent object (such as a menu overlay), and generate the overlay with transparency information.

Step 105 is followed by step 107 wherein a depth indication map is provided for the mixed image. The depth indication map comprises depth indication values for pixels of the mixed image. The depth indication values may for example correspond to a numerical value that directly reflects an image depth for an image objected to which the pixel belongs. However, it will be appreciated that in other embodiments, other depth indication values may be used. For example, the depth indication values may correspond to disparity or parallax values for the pixel.

In the example, the depth indication map comprises depth indication values for each pixel of the mixed image. The depth indication values may correspond to a mix of the depth indication values for the foreground and the background images. For example, for the mixed image, the depth indication value may be taken as the depth indication value of the foreground image except for pixels corresponding to full transparency. For these pixels, the depth indication value may be taken from the background image.

It will be appreciated that different approaches may be used to generate the depth indication map. For example ciated that different approaches may be used to generate the depth indication map. For example, for multi-camera (such as stereo video) sources, a depth map may be generated by a process known in the art as disparity estimation. Depth maps may also be added to existing 2D video footage in a manual, semi-automated, or automated manner. Many of these methods treat foreground and background symmetrically, putting depth transitions halfway the corresponding colour transition. Depth maps may also be generated by a computer graphics rendering process, for example in the form of a z-buffer. Depth maps may be generated for both foreground and background layers and then mixed into a mixed depth map using suitable rules.

Step 107 is followed by step 109 wherein a background depth image is provided. It will be appreciated that in some embodiments, 3D image processing may be based only on the depth information for the mixed image and that step 109 is an optional step.

Step 109 is followed by step 111 wherein 3D image data is provided that includes the background image, the mixed image as well as the transparency and depth indication maps for the mixed image. Optionally, a background depth image may also be included.

Figure 2:
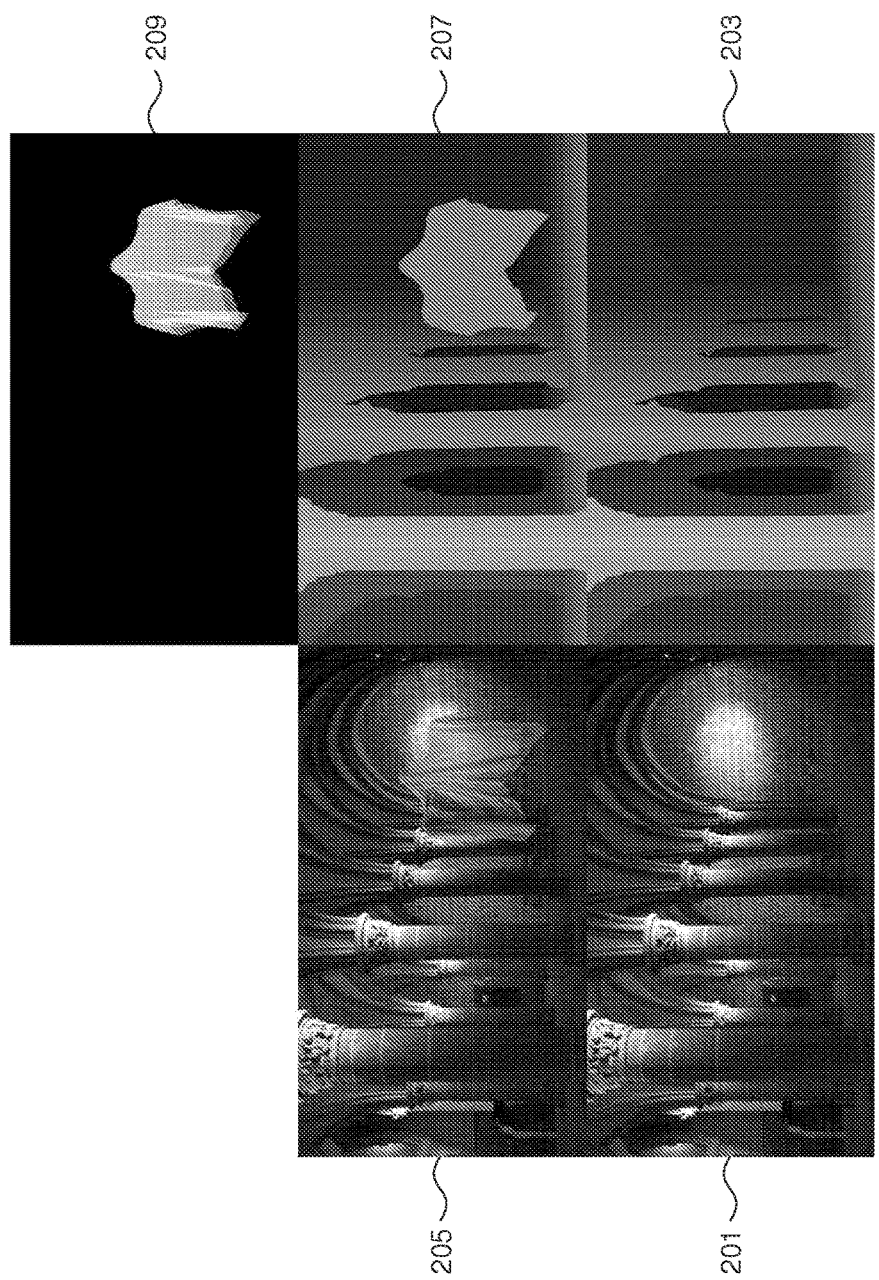
FIG. 2 illustrates an example of elements of 3D image data in accordance with some embodiments of the invention.

FIG. 2 illustrates an example of elements of the 3D image data. FIG. 2 specifically illustrates a background image 201 which has an associated depth indication map 203 which for each pixel has a value indicative of a depth of the background image pixel. In the example, the 3D image data further comprises a mixed image 205 and an associated depth indication map 207. In the specific example, the mixed image 205 is a mixed image that comprises foreground image objects (in the specific example there is only one foreground image object). However, for image areas where there are no foreground image objects, the background pixel values have been copied to the foreground image. Similarly, for these pixels, the background depth indication value has been copied to the foreground depth indication map 207.

The 3D image data also comprises a transparency map 209 which for each pixel indicates a transparency of the foreground. Specifically, for pixel values that are part of a solid foreground image object, the transparency value may indicate full opacity (i.e. that only the foreground is visible). For pixel values that are completely outside any foreground image object, the transparency value may indicate full transparency (i.e. that the background is clearly and fully visible at this location). Furthermore, for semi-transparent foreground image objects, such as the ghost image object of the example, the transparency value may have an intermediate value indicating that both the foreground and background is partially visible. Intermediate transparency values may furthermore be applied around edges of foreground image objects in order to provide a smooth transition between the foreground and background. This may improve anti-aliasing performance.

In some embodiments, the 3D image data may for example be provided to another processing unit or algorithm as individual data or signals respectively providing the background image, the mixed image as well as the transparency and depth information. Also, in some embodiments, the 3D image data may be encoded to generate a 3D image signal that can be effectively transmitted or stored.

FIG. 3 illustrates an example of an image signal encoder which is arranged to generate an image signal based on the method of FIG. 1. The image signal encoder may for example be implemented by a processing element arranged to execute the method of FIG. 1. Specifically, the image signal encoder may be implemented as mixed software and hardware computing platform. However, it will be appreciated that other implementations are possible and that the image signal encoder may for example be implemented as a hardware only platform. For example, the image signal encoder may be implemented by a dedicated application specific integrated circuit which is hardware coded to perform the described operations.

The image signal encoder comprises an image signal generator 301 which is coupled to a foreground image source 303 and a background image source 305. The image signal generator 301 receives the foreground image from the foreground image source 303 and the background image from the background image source 305. It then proceeds to generate a mixed image for the foreground and the background images together with a depth indication map and a transparency map. The 3D image data comprising these components are then fed to an image encoder unit 307 which proceeds to encode the data into an image signal. The processing may specifically be repeated for a plurality of frames of a video signal in order to generate a video image signal.

Figure 4:
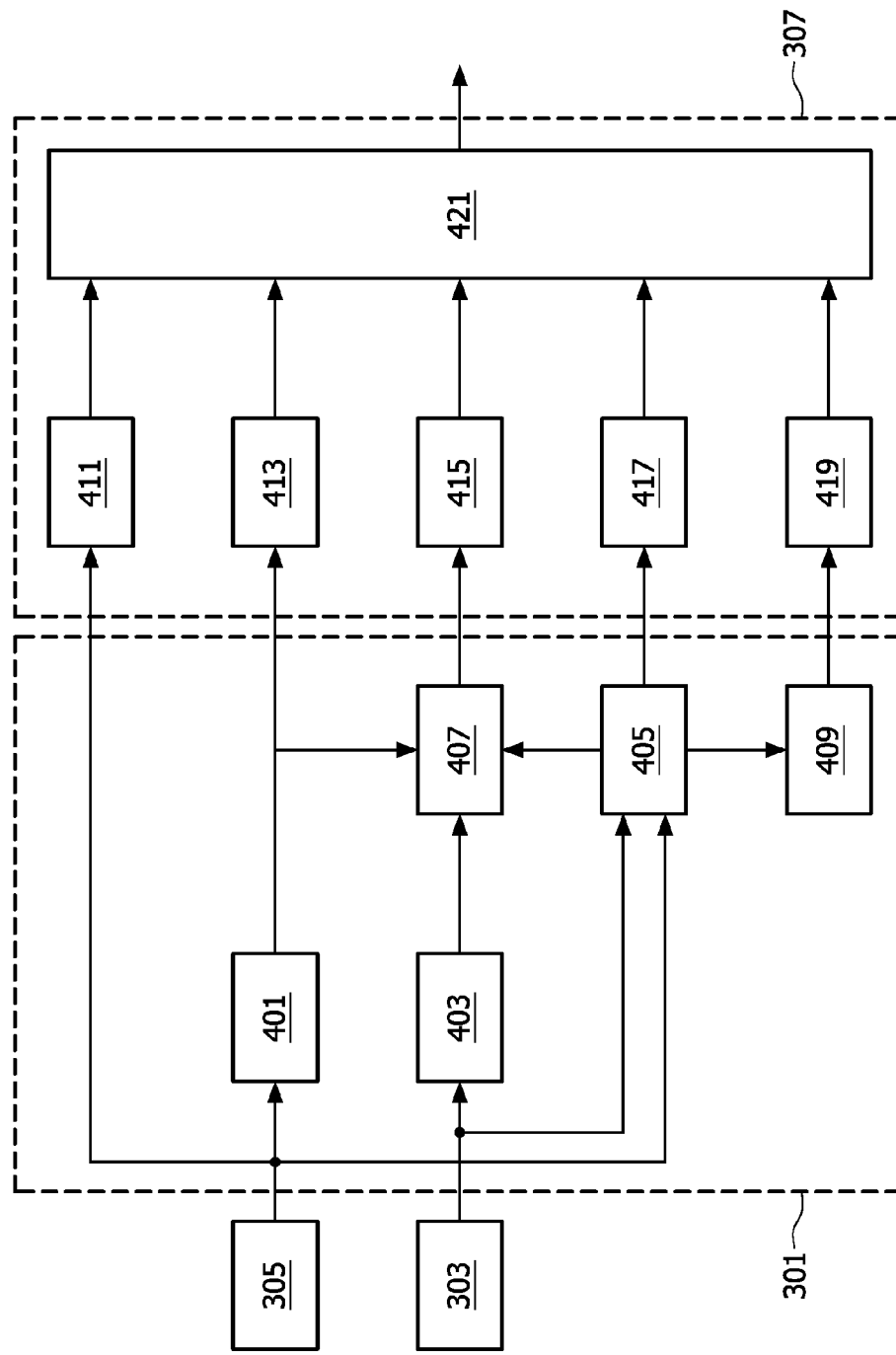
FIG. 4 illustrates an example of an image signal encoder in accordance with some embodiments of the invention.

FIG. 4 illustrates the image signal encoder of FIG. 3 in more detail.

In the example, the image signal generator 301 comprises a background depth processor 401 which proceeds to generate a depth indication map for the background image received from the background image source 305. The background depth indication map may for example be generated as a map comprising a depth level, a depth value, a parallax value or a disparity value for each pixel of the background image. It will be appreciated that various approaches for generating a depth indication maps for an image will be known to the skilled person. For example, the depth indication map may be generated from stereo images using semi-automated 2D to 3D conversion, or from computer graphics. Fully-automated depth generation from 2D video is also possible. In some examples, the background image source 305 may further provide 3D related information (such as depth indications for various image objects or regions), and the background depth processor 401 may proceed to determine the background depth indication map based on this 3D data.

The image signal generator 301 further comprises a foreground depth processor 403 which proceeds to generate a depth indication map for the foreground image received from the foreground image source 303. The foreground depth indication map may for example be generated as a map comprising a depth level, a depth value, a parallax value or a disparity value for each pixel of the background image. The depth indication map for the foreground image may be generated using the same approach and algorithm as for the background depth image. In some examples, the foreground image source 303 may further provide 3D related information and the background depth processor 401 may proceed to determine the background depth indication map based on this 3D data. For example, the foreground image source 303 may provide a list of all foreground image objects together with a depth indication for each foreground image object.

The image signal generator 301 further comprises a mixed image generator 405 which is arranged to generate a mixed image comprising contributions from both the foreground and background images. The mixed image generator 405 combines the foreground and background images such that they reflect a desired transparency characteristic for the foreground. For example, the foreground image will typically comprise foreground image objects that are fully opaque. For pixels belonging to these image objects, the pixel value of the mixed image is set to the pixel value of the foreground image. Also, the foreground image will typically comprise image areas in which there are no foreground image objects. For pixels belonging to these image areas, the pixel value of the mixed image is set to the pixel value of the background image. In addition, the foreground image will typically have some regions that are semitransparent. This may for example occur at edges of the foreground image objects and for foreground image objects which are themselves semitransparent. For pixels belonging to these regions, the pixel value of the mixed image is generated as a linear combination of the pixel value of the foreground and background images. For example, as previously mentioned, the pixel values may be generated as $$y_n = t_n \cdot f_n + (1 - t_n) \cdot b_n$$

where y is the mixed image pixel value, f is the foreground image pixel value, b is the background image pixel value and t is the transparency value for pixel n and is a value between zero and one (where zero represents total transparency and one represents full opacity). The mixing of the images may be performed in response to 3D data received from the foreground image source 303. E.g. a list of foreground image objects may be used to select which image regions are taken from the foreground image and which are taken from the background image.

In the example, the foreground image received from the foreground image source 303 is accompanied by explicit or implicit transparency information for the foreground image. In some embodiments, the foreground image may simply be defined by a number of foreground image objects and the mixed image generator 405 may itself be arranged to generate transparency information, for example by setting a transparency value to represent full opacity for the foreground image objects and full transparency in other areas (e.g. based on a color keying (green/blue) screen approach. In addition, the mixed image generator 405 may itself generate semitransparent regions, for example by introducing a gradual transparency transition around edges of foreground image objects. This may e.g. be achieved using a process as alpha-matting.

The mixed image generator 405 is coupled to a mixed depth processor 407 which is also coupled to the background depth processor 401 and the foreground depth processor 403. The mixed depth processor 407 receives the background and foreground depth indication maps and combines these into a depth indication map for the mixed image. The combination may specifically be performed using a fixed set of rules, such as e.g. a rule that the depth of any pixel including a contribution from a foreground layer should be given the depth of the foreground.

The image signal generator 301 furthermore comprises a transparency processor 409 which generates the transparency map related to the mixed image. Typically this transparency map will be identical to a transparency map for the foreground image or may for example be modified by introducing semitransparent edges to foreground image objects.

In the example, the foreground image received from the foreground image source 303 (via the mixed image generator 405) is accompanied by explicit or implicit transparency information for the foreground image. In some embodiments, the foreground image may simply be defined by a number of foreground image objects and the transparency processor 409 may itself be arranged to generate transparency information, for example by setting the transparency value to represent full opacity for the foreground image objects and full transparency in other areas. In addition, the transparency processor 409 may itself generate semitransparent regions, for example by introducing a gradual transparency transition around edges of foreground image objects. This may e.g. be achieved using a process as alpha-matting. In some examples, the transparency information generated by the mixed image generator may be forwarded to the transparency processor 409 and used to generate the transparency map.

In the example, the different types of 3D image data are separately encoded by the image encoder unit 307. In the example, the image encoder unit 307 comprises a background image encoder 411 which receives the background image and encodes this is using a suitable encoding algorithm.

The image encoder unit 307 further comprises a first depth map encoder 413 which is coupled to the background depth processor 401 and which receives the background depth indication map from this and encodes it is using a suitable encoding algorithm.

The image encoder unit 307 also comprises a second depth map encoder 415 which is coupled to the mixed depth processor 407 and which receives the mixed depth indication map from this and encodes it is using a suitable encoding algorithm (which specifically may be the same is used by the first depth map encoder 413).

The image encoder unit 307 additionally comprises a mixed image encoder 417 which is coupled to the mixed image generator 405 and which receives the mixed image from this and encodes it is using a suitable encoding algorithm (which specifically may be the same is used by the background image encoder 411).

Furthermore, the image encoder unit 307 comprises a transparency map encoder 419 which is coupled to the transparency processor 409 and which receives the mixed image transparency map from this and encodes it is using a suitable encoding algorithm.

All the encoders 411-419 are coupled to a combiner 421 which receives the encoded output data from each of the encoders 411-419 and combines it into a single output data file or stream. It will be appreciated that in other embodiments, the data may e.g. by combined prior to encoding and the combined stream may be encoded. For example, the image data of FIG. 2 may be arranged next to each other and the result may be encoded. Thus, 3D image data is generated which comprises an encoded background image, an encoded mixed foreground and background image, a depth indication map for the background image, a depth indication map for the mixed image and a transparency map related to the mixed image. This 3D data may then be efficiently stored, distributed and processed.

Furthermore, the 3D data may allow a suitable processing device to e.g. render 3D images or 2D images from different viewing angles than the one represented by the foreground and background images. At the same time, a conventional device not having capability of processing the 3D information can simply extract and present the mixed image. Thus, the mixed image can be processed as any other 2D image and since it contains both the foreground and background image information, it provides a usable image in itself. Furthermore, the approach may also provide backwards compatibility for 3D processing. Specifically, the mixed image and the associated mixed depth indication map can themselves be used to provide 3D images. Thus, single layer 3D processing can be performed based on the 3D data. Also, it is possible to perform 3D processing based on the two image layers and associated depth indication maps without the 3D processing using (or indeed being able to use) the transparency information.

It will be appreciated that the method of FIG. 1 may also be used in other devices than for encoding of 3D dimensional data. For example, the approach may be used in a rendering unit which is capable of generating 3D pictures or 2D pictures from different viewing angles.

Figure 5:
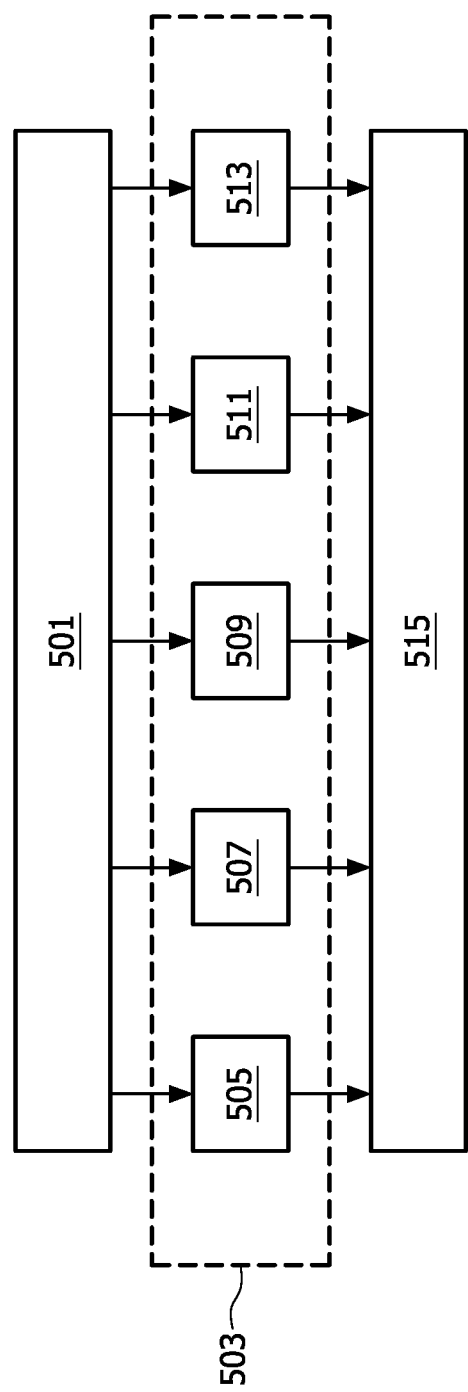
FIG. 5 illustrates an example of rendering unit in accordance with some embodiments of the invention.

An example of such a rendering unit is illustrated in FIG. 5. The rendering unit may for example be implemented by a processing element arranged to execute the method of FIG. 1. Specifically, the rendering unit may be implemented as a mixed software and hardware computing platform. However, it will be appreciated that other implementations are possible and that the rendering unit may for example be implemented as a hardware only platform. For example, the rendering unit may be implemented by a dedicated application specific integrated circuit which is hardware coded to perform the described operations.

The rendering unit comprises a receiver 501 which receives the signal comprising encoded data representing a background image, a mixed image, a transparency map related to the mixed image, a depth indication map for the mixed image, and a depth indication map for the background image. The receiver 501 may specifically receive a data stream generated by the encoder of FIG. 2. The receiver 501 is arranged to receive the signal and to extract the individual types of data.

The receiver 501 is coupled to a decoder 503 which is fed the different types of data. The decoder 503 comprises a background image decoder 505 which decodes the background image data to generate a background image. The decoder 503 furthermore comprises a mixed image decoder 507 which decodes the mixed foreground and background image data to generate a mixed image. The decoder 503 also comprises a background depth map decoder 509 which decodes the background depth map data to generate a background depth indication map. Additionally, the decoder 503 comprises a mixed image depth map decoder 511 which decodes the mixed image depth map data to generate a mixed image depth indication map. Finally, the decoder 503 comprises a transparency decoder 513 which decodes the transparency depth map data to generate a transparency map.

The decoder 503 is furthermore coupled to a 3D render unit 515 which receives the decoded data. Thus, the decoder provides 3D image data to the 3D render unit 515. Specifically the background image decoder 505 provides a background image to the 3D render unit 515, the mixed image decoder 507 provides the mixed image to the 3D render unit 515, the background depth map decoder 509 provides the background depth indication map to the 3D render unit 515, the mixed image depth map decoder 511 provides the mixed image depth indication map to the 3D render unit 515, and the transparency decoder 513 provides the transparency map to the 3D render unit 515.

The 3D render unit 515 can then process the provided 3D data to generate 3D images. Alternatively or additionally the 3D render unit 515 may be capable of rendering 2D views from different directions based on the 3D information. The generation of 3D views or different viewing angle 2D views may be based on both the depth map of the mixed image as well as the depth map of the background image. For example, for areas of the background which are occluded by a foreground image object for the viewing angle represented by the background and mixed image, but not for the viewing angle being rendered, the rendered pixel values may take the depth values of the background depth indication map into account.

When rendering multi-views, it is generally a requirement for high image quality that any component of a foreground layer remains at the foreground level provided there is any contribution from the foreground. Thus, unless the foreground is fully transparent, the depth indication for the mixed image should be at the foreground layer.

However, the inventors have realized that typically the depth transition of the depth indication maps do not tend to coincide with the first pixels that are not fully transparent but rather tend to coincide with the center of the transition from fully transparent to fully opaque (or vice versa).

This tends to be significant as rendering usually includes the reverse operation of the mixing performed in the encoding. This allows the foreground and background to each be rendered at their own depth. For this, the so-called pre-multiplied depth can be used:

$$t_n \cdot f_n = y_n - (1 - t_n) \cdot b_n$$

This foreground can then be rendered using the mixed depth data (which specifically indicates foreground depth for all pixels that are not fully-transparent), and the background can be rendered using the background depth. The resulting rendered pictures can be combined using a rendered version of the foreground transparency to obtain the final result. In this manner, the foreground (e.g. the ghost in FIG. 2) and the background (e.g. the church in FIG. 2) move independently at their own depth when viewpoints are changed.

Figure 6:
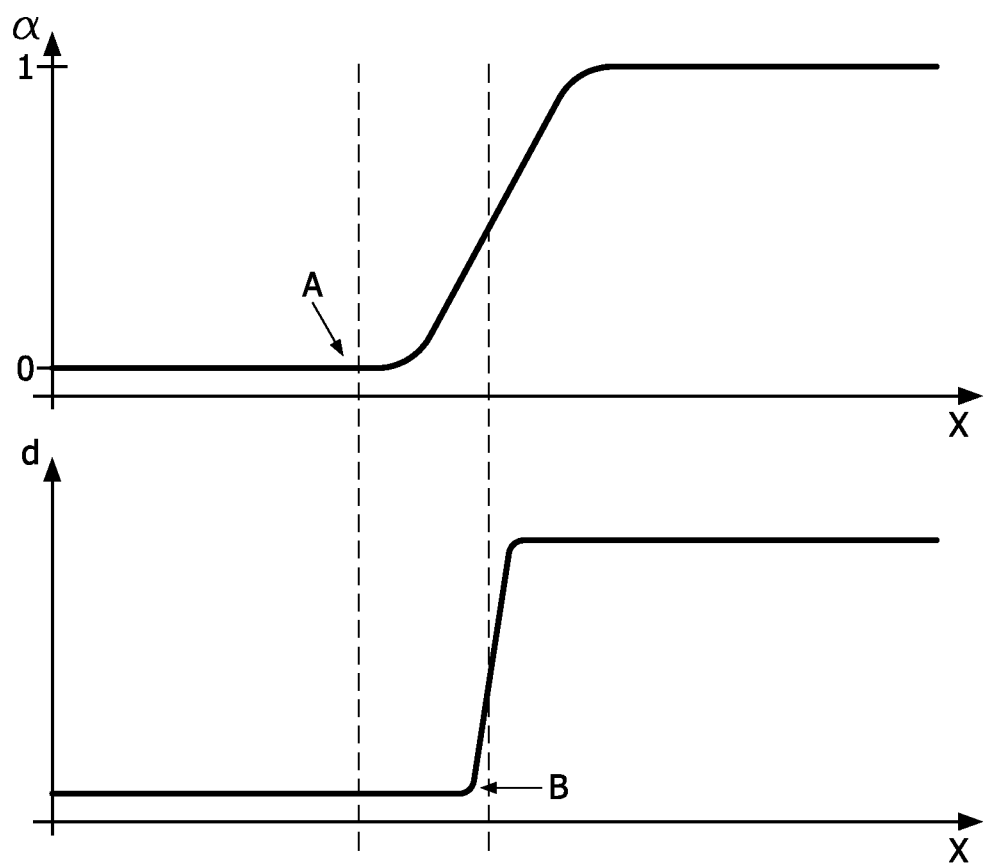
FIG. 6 illustrates an example of a depth and transparency transition for a mixed background and foreground image along a given image direction.

FIG. 6 illustrates a depth and transparency transition for the mixed image along a given image direction which in the specific example corresponds to a scanline (i.e. to a horizontal direction). In the example, the pixel position along the scanline is represented by the horizontal axis X whereas the depth, d, and transparency, $\alpha$, are represented by the vertical axes. In the example, increasing values of the vertical axis corresponds to foreground and decreasing values correspond to background. Thus, a lower value of d corresponds to a depth position further towards the back and a higher value of d corresponds to a depth position further towards the front of the image. Likewise, a lower value of $\alpha$ corresponds to a higher transparency value (lower opacity) corresponding to an increased representation of the background, and a higher value of $\alpha$ corresponds to a lower transparency value (higher opacity) corresponding to an increased representation of the foreground. The example illustrates a situation wherein a foreground object is encountered along the scanline and thus the mixed image transitions from full transparency ($\alpha=0$) to full opacity ($\alpha=1$).

As can be seen in the example, the first point (A) at which the foreground begins to become visible does not coincide with any point (B) of the depth transition. The inventors have realized that this may frequently occur, for example due to depth being encoded and transmitted at lower resolution than the image or transparency information. The depth values are in such scenarios upscaled e.g. using a bilateral filter. However, this tends to result in an alignment of the depth transition with the center of the foreground image object edge rather than with the point at which it starts to become visible. Also, the individual depth indication maps, images and transparency maps are typically individually encoded and this can result in misalignment between them. It will be appreciated that misalignment may occur due to various other issues. The misalignment between foreground object edges and depth transitions can result in significant image quality degradation. For example, when performing multi-view rendering, stripy artifacts can often arise as the background extension to fill de-occlusion areas will repeat pixels that still have some foreground contribution. Thus, foreground is extended into background de-occlusion areas.

The inventors have realized that improved performance can be achieved for systems wherein both transparency and depth indication maps are present. In particular, the inventors have realized that improved image quality can be achieved by modifying values such that an improved alignment of depth indication values and transparency values is achieved. In particular, the relationship between transparency values and depth indication values along a transition corresponding to an edge of a foreground image object can be modified to improve image quality.

Figure 7:
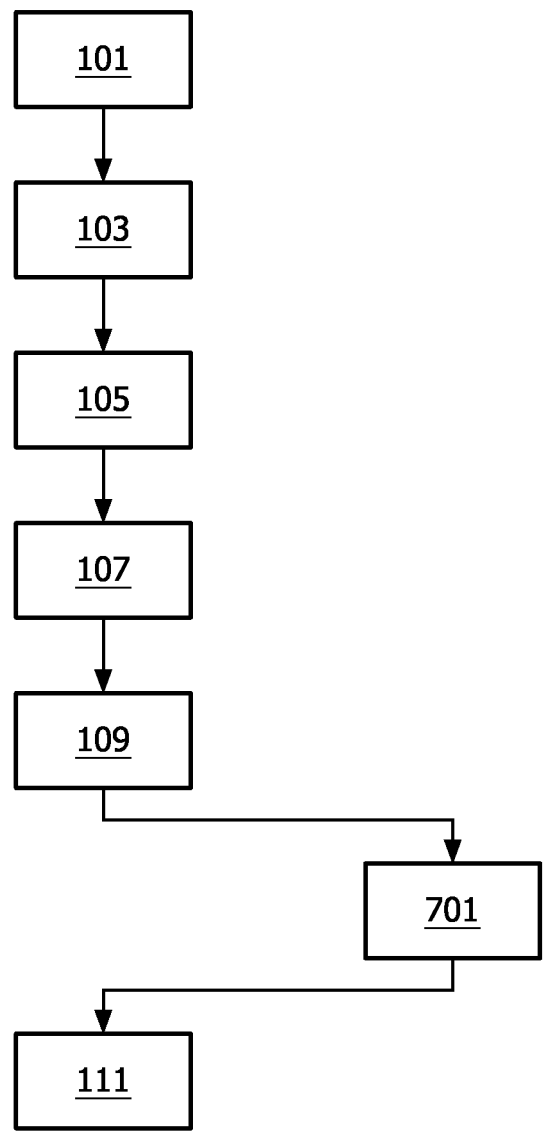
FIG. 7 illustrates an example of a method for providing 3D image data in accordance with some embodiments of the invention.

Thus, in some embodiments, the method of FIG. 1 may further include modifying values of a first set of values from a group of value sets in response to values of a second set of values from the group of value sets, where the group of value sets comprise a set of values corresponding to transparency values of the transparency map and a set of values corresponding to depth indication values of the first depth indication map. Specifically, as illustrated in FIG. 7, the method of FIG. 1 may be modified to include an additional step 701 wherein a relationship between transparency values of the transparency map and depth indication values of the first depth indication map are modified in an image region.

The image region may specifically be an image region that corresponds to an image object edge of the foreground. For example, the mixed image transparency map may be scanned along the scanline directions and whenever a transparency transition occurs (e.g. from fully transparent to fully opaque or from fully opaque to fully transparent), the alignment of this transition and a corresponding depth transition along the scanline for the mixed image depth indication map is performed. Thus, the image region in which alignment is performed may be detected by detecting a transition in the transparency values. It will be appreciated that other ways of detecting a suitable image region to modify may be used, such as e.g. by detecting a transition in the depth indication values.

In the following, specific examples of how to modify the relationship between transparency values and depth indication values for the mixed image in an image region will be described (including examples of how to determine the image region and how to modify the relationship between the depth indication values and the transparency values). The examples, will be described with reference to the rendering unit of FIG. 8.

Figure 8:
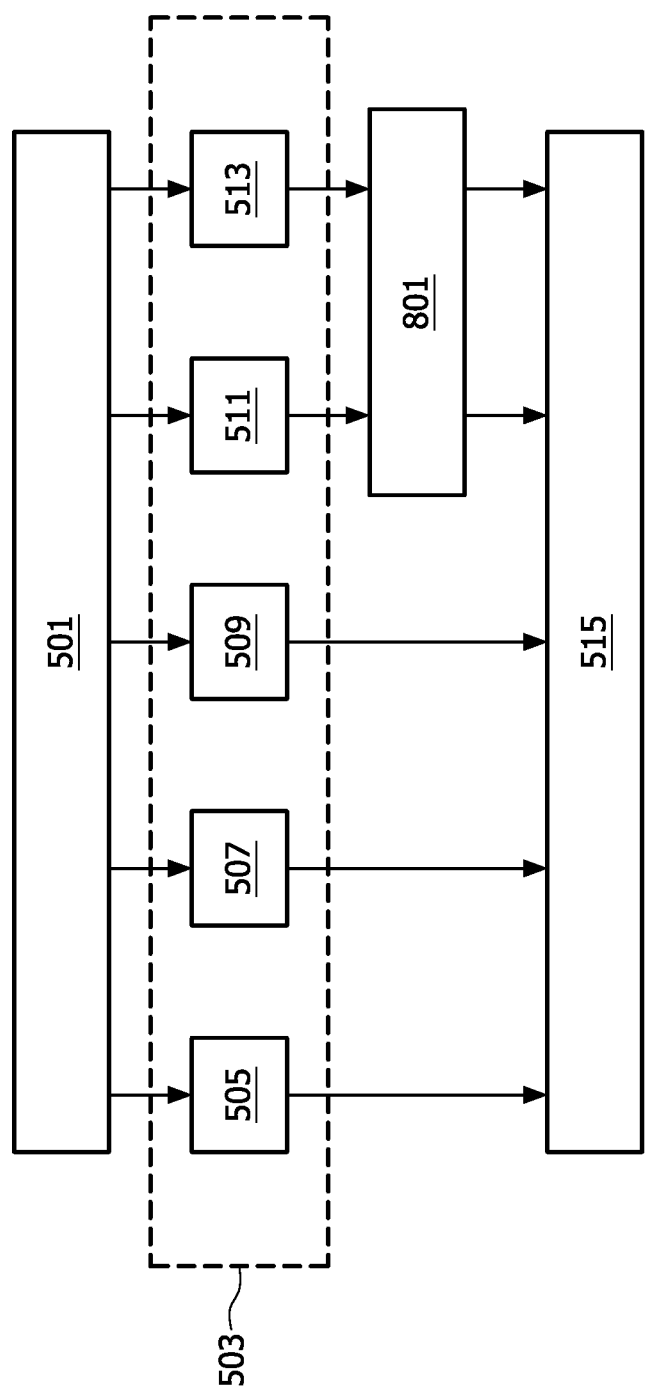
FIG. 8 illustrates an example of a rendering unit in accordance with some embodiments of the invention.

The rendering unit of FIG. 8 is identical to that of FIG. 5 except that it further comprises an alignment processor 801 which is coupled to the mixed image depth map decoder 511 and the transparency decoder 513. The alignment processor 801 receives the transparency map and the depth indication map for the mixed image and proceeds to align transparency values and depth indication values for transitions corresponding to foreground image object edges. The alignment processor 801 is furthermore coupled to the 3D render unit 515 which is fed the depth indication map and the transparency map after modification.

In some embodiments, the alignment processor 801 may adjust transparency values depending on depth indication values. In other embodiments, the modification processor 801 may alternatively or additionally adjust depth indication values depending on transparency values. Thus, from a group consisting of the set of transparency values and a set of depth indication values for the mixed image, the values of one set of the group may be modified in response to the values of the other set of the group. It will be appreciated that in some embodiments both the transparency values and the depth indication values are modified to provide the desired alignment.

In some embodiments, the alignment processor 801 is arranged to modify transparency values of the mixed image/foreground transparency map in response to depth indication values of the mixed image depth indication map.

Specifically, the alignment processor 801 may modify the transparency values in an image region wherein a depth transition and a transparency transition occur along an image direction, which specifically may be a horizontal direction.

The alignment processor 801 may process the image one scanline at a time. The depth indication values and/or the transparency values along the scanline may be monitored and if a transition is detected, the region around this transition is processed to provide an improved alignment of the transitions. In the specific example, the transparency map is scanned along a scanline and whenever a transparency transition from substantially transparent to substantially opaque (or vice versa) is detected, the alignment processor 801 proceeds to modify transparency values of an associated interval of the scanline.

Figure 9:
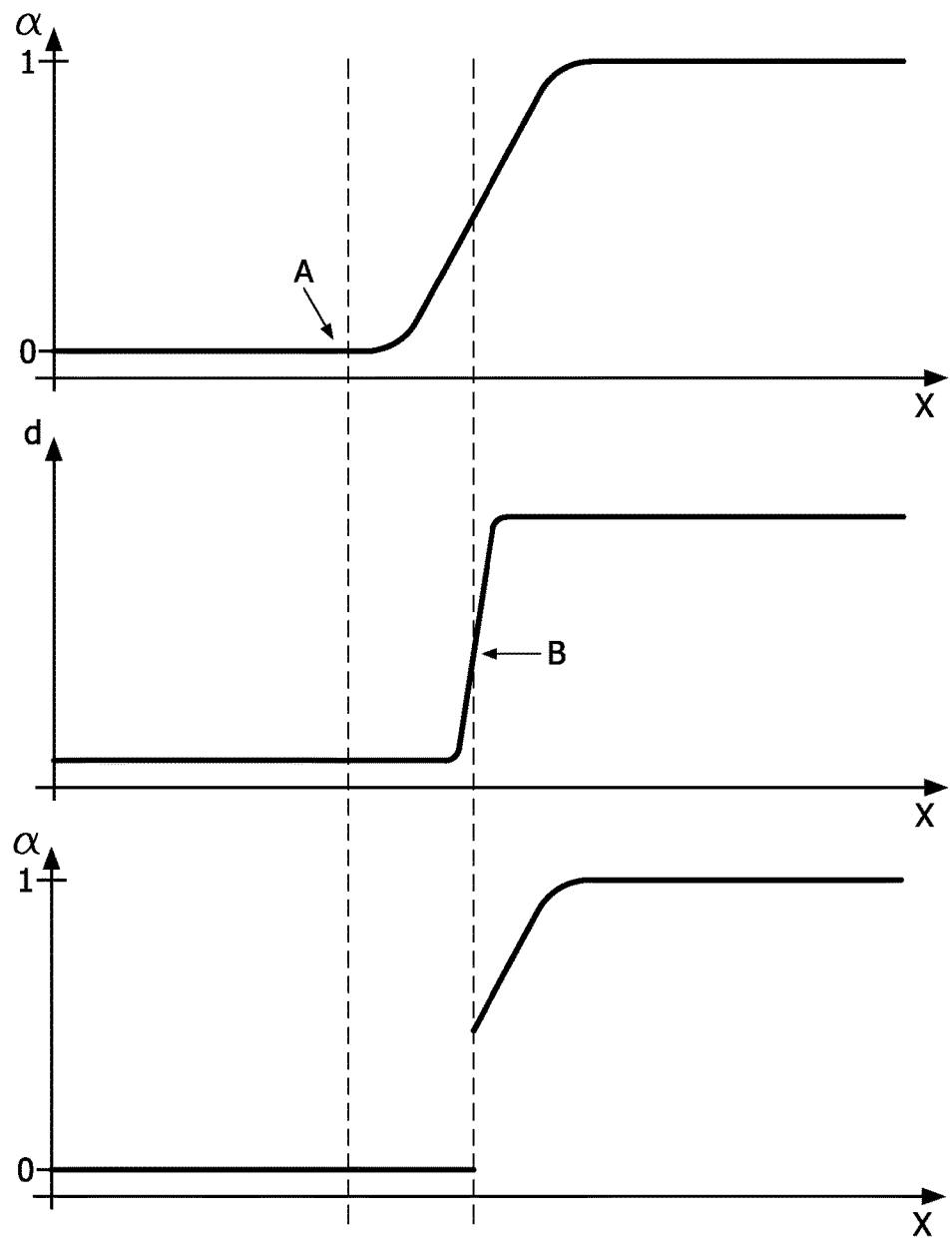
FIG. 9 illustrates an example of a depth and transparency transition for a mixed background and foreground image along a given image direction.

An example of a depth and transparency transition for a scanline is shown in FIG. 9 (corresponding to the example of FIG. 6). When processing the scanline, the alignment processor 801 thus initially detects that a transparency transition occurs. It then proceeds to determine a depth transition point B which is part of the corresponding transition of the depth indication values for the scanline in the depth indication map.

As a specific example, FIG. 9 illustrates a depth and transparency transition for the mixed image along a given image direction which in the specific example corresponds to a scanline (i.e. to a horizontal direction). The alignment processor 801 first detects any transitions that correspond to foreground image objects. As mentioned above, this detection may be based on the transparency values but could alternatively or additionally be based on e.g. the depth indication values.

The alignment processor 801 proceeds to determine a depth transition point B for the depth transition. The depth transition point B corresponds to a point which is part of the transition from a depth outside the foreground image object to a depth corresponding to the foreground image object. It will be appreciated that many different approaches can be used to find the depth transition point B and that in different embodiments and scenarios, the depth transition point may correspond to different positions of the depth transition (e.g. at the beginning, middle or end of the transition). The depth transition point B may for example be simply be determined from the depth indication values of the mixed image depth indication map. For example, if a depth transition of more than a given amount within a given number of pixels occurs, the depth indication values may be evaluated to find the pixel approximately halfway between the start and finish of the transition.

In the specific example, the determination of the depth transition point B is not only based on the depth indication values of the mixed image depth indication map but also based on the depth indication values of the background depth indication map. Specifically, these values will be equal for pixels that originated in the background image and be substantially different for pixels that originated in the foreground image (i.e. for pixels of foreground image objects). Thus, in the specific example of FIG. 9, the difference between the depth indication values for the same pixel will be very low prior to the transition (in a scanline direction) and very high after the transition. The depth transition point B can thus be determined as the pixel location for which the difference of the depth indication values of the background depth indication map and the mixed image depth indication map increases above a give threshold. It will be appreciated that for transitions from foreground image to a background area, the depth transition point may be determined as the pixel location for which the difference decreases below a given threshold.

It will also be appreciated that the described approach of comparing background and mixed image depth indication values can be used not only for determining the depth transition point B but also for detecting transitions corresponding to foreground image object edges.

The alignment processor 801 then proceeds to bias the transparency values of the mixed image transparency values towards a higher transparency (corresponding to lower values of α in FIG. 9). The biasing is performed in an interval that extends from the depth transition point in the direction towards higher transparency. Thus, a relatively higher transparency is introduced to at least some pixel positions which are part of the edge transition of a foreground image object.

It will be appreciated that in some scenarios and embodiments, biasing may additionally be performed in a larger interval than the interval ending at the depth transition point B. For example, in some scenarios some transparency biasing may also be provided in an interval extending from the depth transition point B in the direction of lower transparencies. For example, high transparency (low α) values may be provided for the entire depth transition.

It will be appreciated that the size of the interval extending from the depth transition point B in the direction of increased transparency may be different in different embodiments and scenarios and may be determined differently in different embodiments and scenarios. For example, the interval may simply have a fixed size and thus biasing may always be performed in a fixed interval size. For example, if it is known that foreground image objects typically have semi-transparent edges of, say, 5-10 pixels, a fixed interval size of e.g. 15 pixels may be used.

The biasing is such that at least one transparency value of the interval is adjusted to correspond to a higher transparency than before the biasing. As a specific example, the transparency value for all pixel positions of the interval may set to the highest transparency value of the interval prior to biasing. Thus, the alignment processor 801 may find the minimum α value of the interval and set all transparency values to this α value. FIG. 9 illustrates such an example wherein all α values are set to the same value which specifically corresponds to a highest transparency. In other embodiments, the biasing may simply consist in the alignment processor 801 setting all transparency values in the interval to the highest possible transparency value (i.e. α=0).

The specific described approach thus results in a biasing of transparency values towards higher transparency in an image region wherein the transparency edge transition has already started but wherein the depth transition has not yet started. Thus, prior to the modification, this region might be rendered as part of the background due to the depth information but would still include some of the foreground image object (e.g. the colour thereof). This would result in image degradation. However, by increasing the transparency values, this image degradation is reduced and indeed when setting the transparency values to fully transparent the image degradation in the interval may be substantially reduced or even completely eliminated.

In some embodiments, the start of the biasing interval (and thus the interval size) may be determined by determining a transparency transition point A in response to the transparency values of the transparency map. Specifically, after the depth transition point has been found, the alignment processor 801 may proceed to search for a highest transparency value in an evaluation interval that extends from the depth transition point B in the direction of higher transparency values. For example, the position of the highest transparency value in an interval of 30 pixels from the depth transition point B may be detected and used as the starting point A of the biasing interval.

Thus, as a specific example and referring to FIG. 9, the depth transition point B can be found as described above. The minimum α value in a fixed window away from the depth transition point B (to the left in FIG. 9) is determined, after which the α values in this window are replaced with this minimum α value. Although, determining the start of the biasing interval in this way may be imprecise in scenarios wherein the transparency value does not stabilize following a transition, the approach is highly effective for practical applications.

In some embodiments, the alignment processor 801 is arranged to modify depth indication values of the mixed image depth indication map in response to transparency values of the mixed image/foreground transparency map.

Specifically, the alignment processor 801 may modify the depth indication values in an image region wherein a depth transition and a transparency transition occur along an image direction which specifically may be a horizontal direction.

Thus, the alignment processor 801 may process the image one scanline at a time. The depth indication values and/or the transparency values along the scanline may be monitored and if a transition is detected, the region around this transition is processed as will be described in the following. In the specific example, the transparency map is scanned along a scanline and whenever a transparency transition from substantially transparent to substantially opaque (or vice versa) is detected, the alignment processor 801 proceeds to modify depth values of an associated interval of the scanline.

Figure 10:
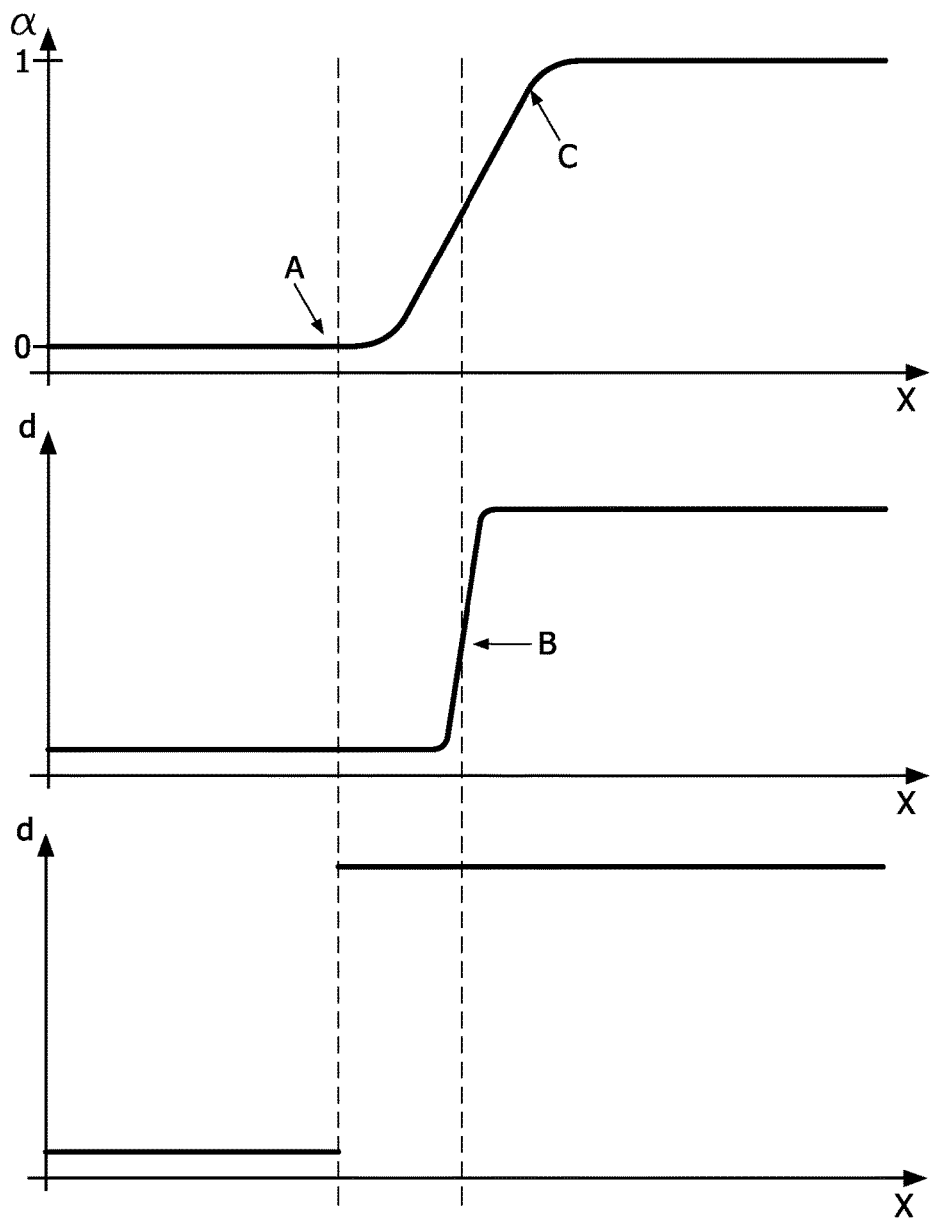
FIG. 10 illustrates an example of a depth and transparency transition for a mixed background and foreground image along a given image direction.

An example of a depth and transparency transition for a scanline is shown in FIG. 10 (corresponding to the example of FIGS. 6 and 9). When processing the scanline, the alignment processor 801 thus initially detects that a transparency transition occurs. It then proceeds to determine a depth transition point B that is part of the transition of the depth indication values for the scanline in the depth indication map.

The alignment processor 801 may then proceed to bias the depth indication values for the mixed image towards a lower depth value (corresponding to an indication more towards the front of the image, i.e. corresponding to an increasing value of d in FIG. 10) for at least some of the pixel locations that are part of the transparency transition.

Specifically, the alignment processor 801 can determine a first transparency transition point A which is part of the transition. It may then bias the depth indication values of an interval along the scan line which ends at the first transparency transition point A and which extends in the direction of lower transparency (i.e. towards the foreground image object).

It will be appreciated that different approaches and criteria for determining the first transparency transition point A may be used in different implementations. In many scenarios, it is advantageous that the first transparency transition point A corresponds to a point which is on the high transparency part of the transition (i.e. it is close to the point where the image object starts to become visible). As a simple example, the first transparency transition point A may thus be determined as the position at which the α value crosses a predetermined threshold corresponding to almost full transparency (the direction of the threshold crossing will depend whether the transition is to or from the foreground image object).

The biasing of the depth indication values towards lower depth values (more foreground) is performed in an interval which begins at the first transparency transition point and extends in the direction towards lower transparency. Thus, a relatively lower depth is introduced to at least some pixel positions which are part of the edge transition of a foreground image object.

It will be appreciated that the size of the interval extending from the first transparency transition point A in the direction of reduced transparency may be different in different embodiments and scenarios and may be determined differently in different embodiments and scenarios. For example, in a simple example, the interval may have a fixed size in which biasing is always performed. For example, if it is known that foreground image objects typically have semi-transparent edges of, say, 5-10 pixels, a fixed intervals size of e.g. 15 pixels may be used.

The biasing is such that at least one depth indication value of the interval is adjusted to correspond to a lower depth level (more towards the foreground) than before the biasing. As a specific example, the depth indication value for all pixel positions of the interval may be set to the lowest depth value of the interval prior to biasing. Thus, the alignment processor 801 may find the maximum d value of the interval and set all depth indication values to this d value. FIG. 10 illustrates such an example wherein all the d values are set to the value corresponding to the depth indication value following the transition. In other embodiments, the biasing may simply consist in the alignment processor 801 setting all depth indication values in the interval to a value corresponding to the foreground.

The specific described approach thus results in a biasing of depth indication values towards the foreground in an image region corresponding to the transparency edge transition including an area wherein the transparency transition has already started but wherein the depth transition has not yet started. Thus, prior to the modification, this region might be rendered as part of the background due to the depth information but would still include some of the foreground image object (e.g. the colour thereof). This would result in an image quality degradation. However, by reducing the depth indication values, this image quality degradation is reduced. In particular, the approach may allow that image pixel values which include a contribution from the foreground will be treated as foreground image pixels.

In some embodiments, the start of the biasing interval (and thus the interval size) may be determined by determining a second transparency transition point C in response to the transparency indication values along the scanlines. The second transparency transition point C corresponds to a lower transparency value than the first transparency transition point A, i.e. it corresponds to a position closer to or part of the foreground image object itself. As a simple example, the second transparency transition point C may be determined as the point at which the α value crosses a predetermined threshold which is close to full opacity.

In the specific example, the first transparency transition point A and second transparency transition point C are found by searching in an interval around a depth transition point B. Specifically, the depth transition point B (and indeed the existence of a transition) may be found using the same approach as described with reference to FIG. 9 for the situation wherein transparency values are modified in response to depth indication values.

The transparency values in a transparency search interval around the depth transition point B are then evaluated and the first transparency transition point A and second transparency transition point C can specifically be determined as the points having the highest, respectively lowest, transparency values. The depth indication values in the interval from the first transparency transition point A to the second transparency transition point C can then be biased towards lower depth levels, and specifically the depth indication values of the interval can be set to the highest depth indication value in the interval, i.e. to the depth indication value of the second transparency transition point C.

This approach tends to be reasonably insensitive to the accuracy with which point B is found, but may result in degraded performance in some scenarios wherein the transparency value does not stabilize. However, the approach tends to be highly effective for practical applications.

It will be appreciated that although the description of the examples of FIGS. 6, 9 and 10 focused on a situation wherein the transitions are evaluated along a direction corresponding to a scanline direction, and specifically a horizontal scanline direction the approach is not limited to such a scenario. Indeed, it will be appreciated that in other scenarios, transitions may alternatively or additionally be evaluated along other image directions. For example, image directions substantially perpendicular to the scanline direction may alternatively or additionally be evaluated. Thus, the examples of FIGS. 6, 9 and 10 apply equally to other image directions, such as specifically a vertical image direction. This may improve image quality in many scenarios and may specifically improve the perceived quality of substantially horizontal image edges. As another example, the processing may be applied in a direction which is substantially perpendicular to an object edge. Thus, in some examples, edges of an image object may be detected and a predominant direction of a specific edge may be identified. A substantially perpendicular direction may then be determined and the described approach may be applied to this direction.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of providing three dimensional image data for use in rendering image elements of at least one view of the three dimensional image data, the method comprising:
providing a 2D first image, as a background image
providing a mixed image by overlaying a second image, as a foreground image, on the first image, said overlaying incorporating transparency data for the second image, wherein the mixed image includes background image objects and foreground image objects;
providing a transparency map related to the mixed image, the transparency map comprising transparency values for pixels of the mixed image;
providing a first depth indication map for the mixed image, the first depth indication map comprising depth indication values for pixels of the mixed image;
modifying values of a first set of values in an image region of the mixed image determined between a transition point in the transparency map and a transition point in the first depth indication map based on a second set of values, wherein the first set of values comprising a set of values corresponding to one of: the transparency values and the depth indication values, and the second set of values comprising a set of values corresponding to one of: the depth indication values and the transparency values, wherein the modified values of the first set of values represent modification of the first set of values dependent on the second set of values; and
generating the three dimensional image data, said three-dimensional image data comprising the first image, the mixed image, the transparency map and the first depth indication map.

2. The method of claim 1 further comprising generating an image signal comprising the three dimensional image data.

3. The method of claim 1 further comprising:
rendering a view for a different viewing angle than a viewing angle of the first and second image in response to the three dimensional image data.

4. The method of claim 3 further comprising:
rendering image elements corresponding to image elements of multiple views of the three dimensional image data for use in visualizing a three dimensional image in response to the three dimensional image data.

5. The method of claim 1, wherein the image region corresponds to an image object edge.

6. The method of claim 1 further comprising:
modifying a relationship between transparency values of the transparency map and depth indication values of the first depth indication map in the image region.

7. The method of claim 6 wherein modifying the relationship comprises aligning a transparency transition of the transparency map along an image direction and a depth transition in the depth indication values of the first depth indication map along the image direction.

8. The method of claim 1 further comprising:
modifying transparency values of the transparency map in response to depth indication values of the first depth indication map.

9. The method of claim 8 wherein modifying transparency values comprises:
biasing transparency values of the transparency map towards higher transparency in the image region being part of a transparency transition in the transparency map and not being part of a depth transition in the depth indication values in the first depth indication map.

10. The method of claim 8 wherein modifying transparency values comprises modifying transparency values in at least part of the image region comprising a depth transition in the depth indication values and a transparency transition along an image direction by:
determining a first depth transition point in response to the depth indication values of the first depth indication map along the image direction;
biasing transparency values of the transparency map along the image direction towards higher transparency for pixels of an interval along the image direction extending from the first depth transition point in a direction of at least one of a higher transparency and a lower depth.

11. The method of claim 10 further comprising:
determining a first transparency transition point in response to the transparency values of the first transparency map along the image direction and wherein the interval extends from the first transparency point to the first depth transition point.

12. The method of claim 11 further comprising:
determining the first transparency transition point as a point along the image direction having a highest transparency value in an evaluation interval extending from the depth transition point in a direction of at least one of a higher transparency and a lower depth.

13. The method of claim 10 wherein said biasing comprises:
setting transparency values of all transparency values of the interval to a highest transparency value of the interval prior to biasing.

14. The method of claim 10 further comprising:
providing a second depth indication map for the first image, the second depth indication map comprising depth indication values for pixels of the first image; and wherein determining the first depth transition point comprises further determining the first depth transition point in response to depth indication values of the second depth indication map.

15. The method of claim 14 wherein determining the depth transition point comprises:
determining the depth transition point in response to a comparison of depth indication values of the first depth indication map and depth indication values of the second depth indication map.

16. The method of claim 14 wherein determining the depth transition point comprises:
determining the depth transition point as a point along the image direction for which a difference between a depth indication value of the second depth indication map and a depth indication value of the first depth indication map crosses a threshold.

17. The method of claim 1 further comprising:
modifying depth indication values of the first depth indication map in response to transparency values of the transparency map.

18. The method of claim 17 wherein modifying depth indication values comprises:
biasing depth indication values of the first depth indication map towards foreground depth indication values in the image region corresponding to a transparency transition in the transparency map.

19. The method of claim 17 wherein modifying depth indication values comprises:
modifying depth indication values in at least part of an image region comprising a depth transition and a transparency transition along an image direction by:
determining a first transition point in response to at least one of the transparency values of the transparency map and the depth indication values of the first depth indication map along the image direction;
biasing depth indication values of the first depth indication map along the image direction towards foreground depth indication values for pixels of an interval along the image direction ending at the first transparency transition point and extending from the first transparency point in a direction of lower transparency.

20. The method of claim 19 wherein the first transition point is a first transparency transition point determined in response to the transparency values of the transparency map and further comprising:
determining a second transparency transition point in response to the transparency indication values of the transparency map along the image direction, the second transparency transition point corresponding to a lower transparency than the first transparency point; and
wherein the interval extends from the first depth transition point to the second depth transition point.

21. The method of claim 19 wherein the first transition point is a first transparency transition point determined in response to the transparency values of the transparency map and further comprising:
determining a first depth transition point in response to depth indication values of the first depth indication map along the image direction;
determining a transparency search interval in response to the first depth transition point; and
determining the first transparency point comprises determining the first transparency point in response to transparency values in the transparency search interval.

22. The method of claim 19 wherein biasing depth indication values comprises setting all depth indication values of the interval to a depth indication value corresponding to a furthest foreground depth indication value for the interval prior to biasing.

23. A computer program stored on a non-transitory medium, said computer program containing code enabling a processor to carry out the method of claim 1.

24. A method of generating an image signal, the method comprising:
providing a 2D first image, as a background image;
providing a mixed image by overlaying a second image, as a foreground image, on the first image, the overlaying incorporating transparency value for the second image, wherein the mixed image includes background image objects and foreground image objects;
providing a transparency map related to the mixed image, the transparency map comprising transparency values for pixels of the mixed image;
providing a first depth indication map for the mixed image, the first depth indication map comprising depth indication values for pixels of the mixed image;
modifying values of a first set of values in response to values of a second set of values in an image region of the mixed image determined based on a transition of one of the first set of values and the second set of values, wherein the first set of values corresponding to one of: said transparency values and said depth indication values and the second set of values corresponding to one of: said transparency values and said depth indication values, wherein the first set of values are modified from a transition point of the first set of values to a transition point of the second set of values; and
generating the image signal representing the first image, the mixed image, the transparency map and the first depth indication map.

25. The method of claim 24, wherein the first set of values comprises transparency values of the transparency map and the second set of values comprises depth indication values of the first depth indication map.

26. The method of claim 24, wherein the first set of values comprises depth indication values of the first depth indication map and the second set of values comprises transparency values of the transparency map.

27. A method of rendering an image, the method comprising:
providing a first image;
overlaying a second image onto a section the first image to render a mixed image as a combination of the first image and a second image, the second image being a foreground image relative to the first image and the combination incorporating a transparency value for the second image, wherein the mixed image includes first image objects and second image objects;

providing a transparency map related to the mixed image, the transparency map comprising transparency values for pixels of the mixed image;
providing a first depth indication map for the mixed image, the first depth indication map comprising depth indication values for pixels of the mixed image;
setting values of a first set of values within in an image region of the mixed image representative of a transition point of the first set of values to a transition point of a second set of values, the first set of values corresponding to one of: said transparency values and said depth indication values and the second set of values corresponding to the other of: said transparency values and said depth indication values; and
rendering the image, wherein the image comprises the first image, the mixed image, the transparency map and the first depth indication map.

28. An image signal encoder comprising:
a data processor, accessing software, which configures the data processor to:
receive a first image;
render a mixed image by overlaying a second image onto the first image, the second image being a foreground image relative to the first image and the overlaying incorporating a transparency value for the second image, wherein the mixed image includes image objects that occur in the first image and in the second image;
generate a transparency map related to the mixed image, the transparency map comprising transparency values for pixels of the mixed image;
generate a first depth indication map for the mixed image, the first depth indication map comprising depth indication values for pixels of the mixed image;
modify values of a first set of values in response to values of a second set of values in an image region of the mixed image determined between a transition of the first set of values and a transition of the second set of values, wherein the first set of values corresponding to one of: said transparency values of the transparency map and said depth indication values of the first depth indication map and the second set of values corresponding to the other of said transparency values of the transparency map and said depth indication values of the first depth indication map; and
generate a signal comprising the first image, the mixed image, the transparency map and the first depth indication map: and
encode said image to generate an image signal.

29. An image rendering unit comprising:
hardware configure to:
receive, as a background image, a first image;
render a mixed image as a combination of the first image and a second image by overlying the second image onto a section of the first image, the second image being a foreground image relative to the first image and the combination incorporating a transparency value for the second image, wherein the mixed image includes background image objects and foreground image objects;
provide a transparency map related to the mixed image, the transparency map comprising transparency values for pixels of the mixed image;
provide a first depth indication map for the mixed image, the first depth indication map comprising depth indication values for pixels of the mixed image;
determine a transition point in each of the transparency map and the first depth indication map;
modify values of a first set of values in an image region represented between the transition point in the transparency map and the first depth indication map, the first set of values comprising one of: said transparency values and said depth indication values of the first depth indication map, and said second set of values comprising of the other of: said transparency values and said depth indication values of the first depth indication map; and
generate a composite image, said composite image comprising the first image, the mixed image, the transparency map and the first depth indication map; and
render the composite image.

30. An apparatus for generating an image signal, said apparatus comprising:
a hardware platform configured to execute software, the software configuring the hardware to:
process data representing a first image, said first image representing a background image;
process data representing a mixed image by overlaying a second image onto the first image, the second image being a foreground image relative to the first image and the overlaying incorporating a transparency value for the second image, wherein the mixed image includes background image objects and foreground image objects;
process data representing a transparency map related to the mixed image, the transparency map comprising transparency values for pixels of the mixed image;
process data representing a first depth indication map for the mixed image, the first depth indication map comprising depth indication values for pixels of the mixed image;
modify values of a first set of values in response to values of a second set of values in an image region of the mixed image, wherein the image region representing an edge region between the first image and the second image and is presented between a transition point in the transparent map and a transition point in the depth indication map, the first set of values corresponding to one of: transparency values of the transparency map and depth indication values of the first depth indication map and the second set of values corresponding to one of: said transparency values of the transparency map and said depth indication values of the first depth indication map; and
generate the image signal, said image signal comprising the first image, the mixed image, the transparency map and the first depth indication map.

* * * * *